June 25, 1957 J. M. MILLER 2,797,004
ASSEMBLY FOR REMOVING AUTOMOTIVE AXLES AND WHEEL ASSEMBLIES
Filed Oct. 15, 1954 5 Sheets-Sheet 1

John M. Miller
INVENTOR.

June 25, 1957  J. M. MILLER  2,797,004
ASSEMBLY FOR REMOVING AUTOMOTIVE AXLES AND WHEEL ASSEMBLIES
Filed Oct. 15, 1954  5 Sheets-Sheet 2

John M. Miller
INVENTOR.

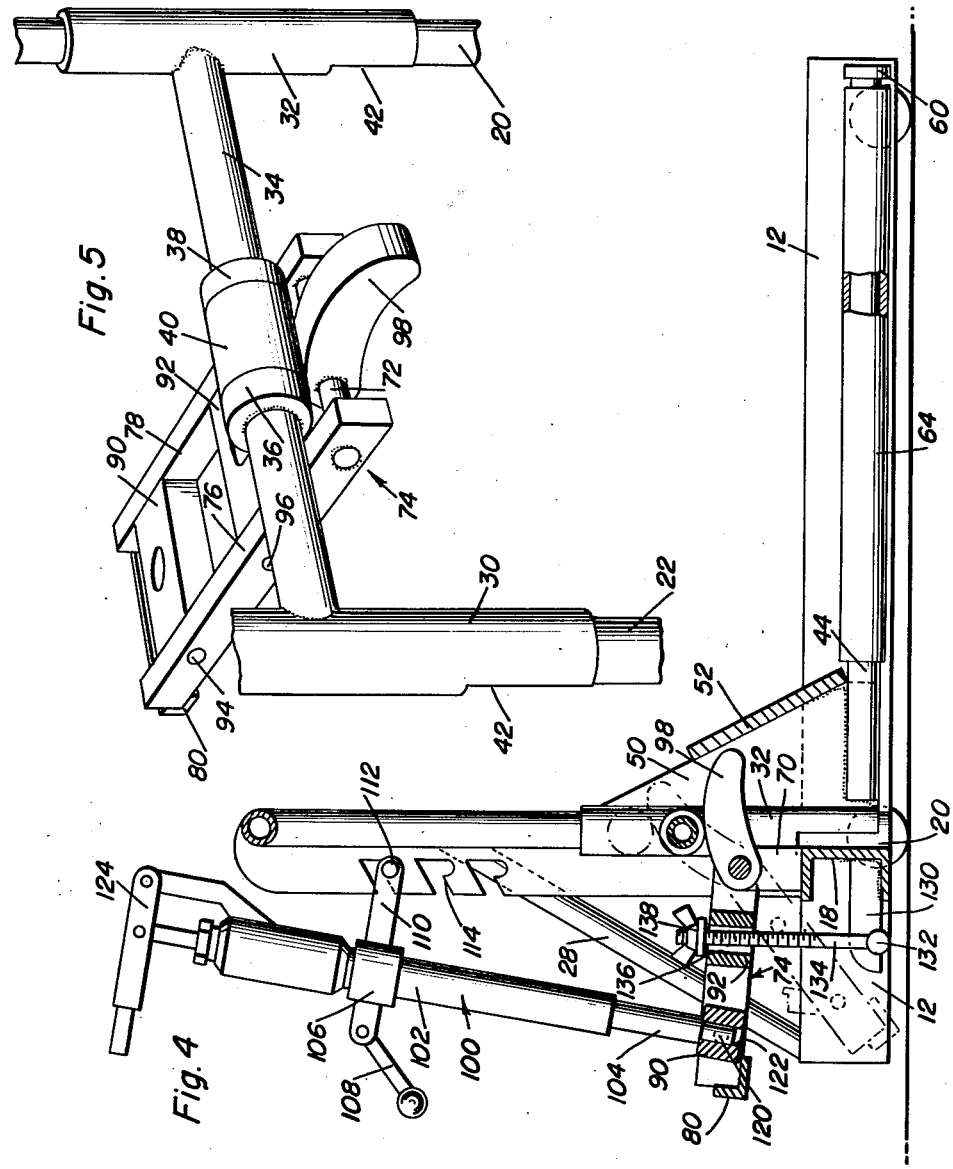

June 25, 1957  J. M. MILLER  2,797,004
ASSEMBLY FOR REMOVING AUTOMOTIVE AXLES AND WHEEL ASSEMBLIES
Filed Oct. 15, 1954  5 Sheets-Sheet 4
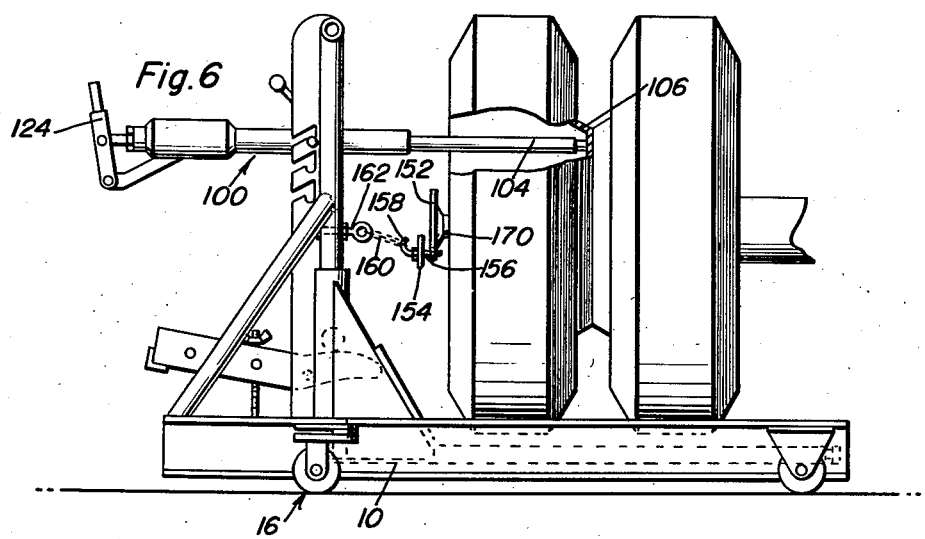
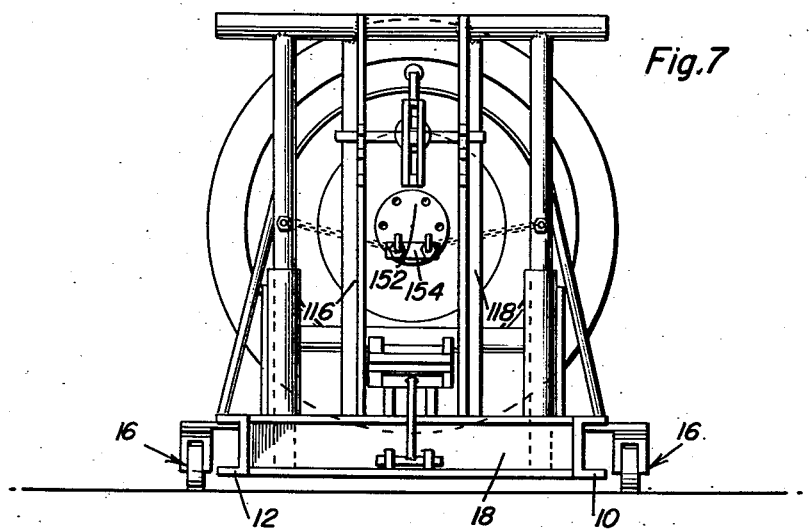
John M. Miller
INVENTOR.

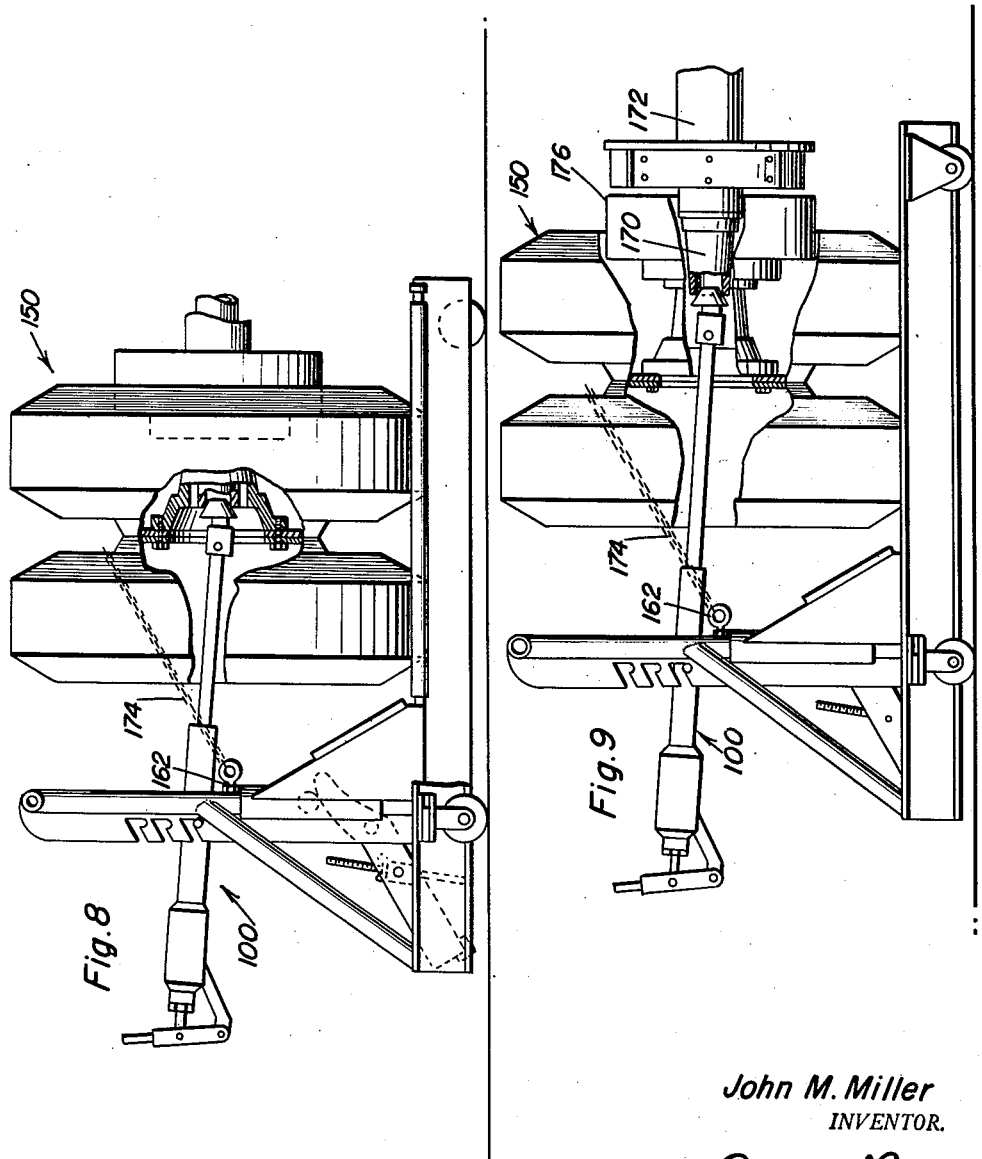

United States Patent Office 2,797,004
Patented June 25, 1957

2,797,004

ASSEMBLY FOR REMOVING AUTOMOTIVE AXLES AND WHEEL ASSEMBLIES

John M. Miller, Blytheville, Ark.

Application October 15, 1954, Serial No. 462,454

6 Claims. (Cl. 214—331)

This invention relates generally to an assembly for removing automotive axles and for removing and replacing wheel assemblies subsequent to the removal of the axles.

Difficulty is encountered in the servicing and maintenance of trucks and the like as occasioned by the difficulty with which the rear wheel assemblies are removed for routine inspection of the roller or ball bearings rotatably supporting the wheels with the result that inspection and servicing thereof is easily neglected until such time as a breakdown in the equipment occurs at this point. Most large automotive trucks utilize a final drive assembly of the full floating axle type where the wheel assemblies are journaled by means of ball or roller bearings upon extensions of the rear axle housings and wherein the drive axles are journaled within the axle housings and are secured at the outer ends by means of flanges to the wheel assemblies such that the axles receive only torsional loads. In such full floating axle drive assemblies, the inner ends of the axles are splined and are engaged with the differential side pinions and no means is provided for preventing removal of the axle assemblies other than the attachment of the same to the wheels or brake drums of the vehicle. Accordingly, in order to remove a wheel assembly for inspection of its journaling bearings, it is necessary to first remove the floating axles and then the wheel assemblies, together with the brake drums. However, it frequently occurs that, due to the heavy loads placed upon the vehicle axles, the splined portions thereof become burred and due to the fact that the inner ends of the axles usually project completely through the differential side pinions, it may be extremely difficult to remove the axles. Additionally, the wheel and tire assemblies are usually of dual construction and are extremely heavy so that even if the axles are removed, it is an extremely difficult operation to remove the wheel and tire assemblies together with the brake drum for inspection of the journaling bearings.

It is accordingly a primary object of this invention to provide an assembly for readily and easily removing full floating vehicle axles and their associated wheel and brake drum assemblies.

Another object of this invention is to provide an assembly for moving full floating vehicle axles and wheel assemblies in which a jack structure is utilized both for the purpose of elevating the vehicle wheels in such a manner as to relieve the strain of the journaling bearings such that a wheel assembly removal is made possible but also to serve as a jack element to be positioned against a portion of the vehicle for urging the assembly away form the same such that an axle, attached to the assembly, may be removed from the vehicle.

These, together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 4 is an enlarged vertical section taken substantially along the plane of 4—4 in Figure 3;

Figure 5 is a perspective view showing the operation of the elevating mechanism;

Figure 6 is an elevational view showing the assembly during the operation of an axle's removal;

Figure 7 is an end elevational view of the assembly shown in Figure 6;

Figure 8 is a side elevational view with portions thereof partly broken away to show the assembly in use during the removal of the wheel and brake drum assemblies;

Figure 9 is a view similar to that of Figure 8 but showing the jack mechanism extended and the wheel and brake drum assembly substantially completely removed from its associated axle housing;

Figure 10 is a perspective view of a portion of the elevating carriage and one of the guide posts for supporting the same;

Figure 11 is a perspective view of an attachment used during the wheel and brake drum removing operation; and Figure 12 is a sectional view taken through the assembly shown in Figure 11.

Figure 1:
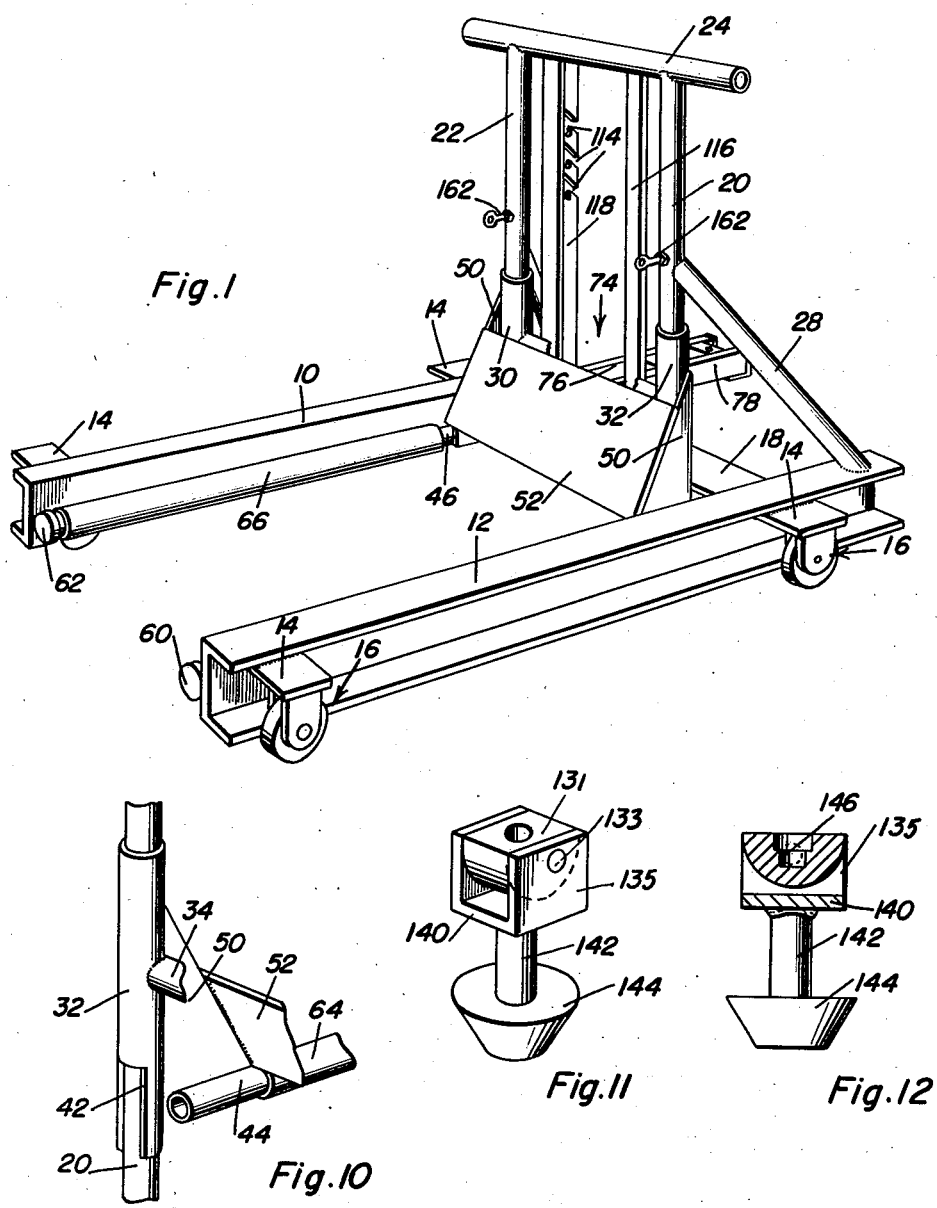
Figure 1 is a perspective view of the assembly.

Referring now more particularly to the drawings, it will be seen that the assembly consists of a main frame section including the spaced leg members 10 and 12. The leg members 10 and 12 as indicated in the drawings are formed of channel iron but it is to be of course understood that any suitable cross-sectional configuration may be utilized in their construction, at the option of the builder. Horizontal tab members 14 are secured to each of the leg members 10 and 12 and project laterally therefrom from which the wheel assemblies 16 are suspended in the manner shown whereby the entire assembly is readily moved from place to place within a shop or the like.

It is to be of course understood that either the front pair or rear pair of supporting wheels 16 or both pairs may be constructed such as to provide a castering action whereby the mechanism may be manipulated with great flexibility, as desired.

Adjacent the rearward ends of the legs 10 and 12 is a transverse cross brace member 18. The cross brace 18 serves to rigidly interconnect the leg members 10 and 12 and provide a sturdy and rigid structure thereby. Rigidly secured as by welding or the like at their lower ends to the cross brace member 18 are a pair of vertical guide posts 20 and 22, these members being rigidly interconnected at their upper ends by the transverse bar member 24 which, in view of the fact that its opposite ends project laterally beyond the guide posts 20 and 22, may also serve as a handle for guiding the assembly. To rigidify the guide posts 20 and 22, diagonal brace members 26 and 28 may be provided in the manner shown to extend between intermediate portions of the guide posts and the rearward ends of the frame leg members 10 and 12.

Slidably received on the guide posts 20 and 22 is a carriage assembly which includes a pair of tubular sleeve members 30 and 32 embracing the guide posts and interconnected by a horizontal bar member 34 in the manner shown most clearly in Figure 5. The bar 34 has a pair of collar members 36 and 38 rigidly secured thereto in spaced relation such as to receive a bushing or roller 40 therebetween which is permitted free rotation upon the bar 34. The purpose of this construction will be presently apparent.

It is to be noted that the lower ends of the tubular members 30 and 32 are notched or cut away as at 42 to permit the lower ends thereof to project downwardly to the position shown most clearly in Figure 4 whereat there is secured the forwardly projecting horizontal arm members 44 and 46 which are disposed in parallelism with the legs 10 and 12 and immediately adjacent thereto. A gusset plate 50 is associated with each of the tubular sleeve members 30 and 32 and with their associated arm members 44 and 46 so as to provide a rigid construction and a guard plate member extends between the forward slanted edges of the gusset plates 50 for the purpose of guarding the lever mechanism hereinafter described.

It will be noted that the forward or free ends of the leg members 44 and 46 are upset or enlarged as at 60 and 62 and that roller members 64 and 66 are rotatably received thereon between the upset ends and the guard plate 52. The purpose of this construction is to permit rotation of the wheel assemblies when they are resting upon the support arms 44 and 46 inasmuch as the wheel assemblies will engage directly upon the rollers 64 and 66.

A pair of bracket ear members 70 are secured to the upper surface of the cross brace member 18 and these members rotatably receive a cross shaft member 72 which forms part of an actuating lever assembly indicated generally by the reference character 74. The lever assembly or mechanism consists of a pair of spaced side members 76 and 78 rigidly interconnected at their rearward ends by an angle iron member 80 and at their forward ends by the cross shaft 72.

Block members 90 and 92 are pivotally received between the side frame members 76 and 78 by means of trunnion shaft members 94 and 96 respectively whereas the cross shaft 72 has rigidly attached thereto centrally between the side frame members a forwardly projecting tongue member 98 which is arcuately formed in a manner shown most clearly in Figure 5. The portions of the cross shaft 72 which lie between opposite sides of the tongue 98 and adjacent side frame members 76 and 78 rotatably receive the aforementioned bracket ears 70 such that the entire mechanism 74 is pivotally mounted about the axis of the cross shaft. The tongue 98 projects forwardly beneath the roller 40 on the shaft 34 of the carriage assembly and is adapted, upon the depression of the rearward end of the assembly 74, to elevate the carriage assembly and consequently the arms 44 and 46 such as to raise a load placed thereon.

For the purpose of elevating the carriage assembly, a jack mechanism indicated generally by the reference character 100 is utilized. The jack is of entirely conventional construction and includes a main body portion 102 and an extensible plunger portion 104 at the lower end thereof as illustrated in Figure 4. A collar member 106 is slidably received on the main body portion on a cylindrical shaped portion thereof and this collar may be of split construction and it may have associated therewith a clamping arm member 108 whose manipulation by well known means selectively spreads or tightens the split collar 106 to securely engage it upon the main body portion 102 of the jack assembly. The collar 106 is provided with laterally extending arm members 110 which carry at their free ends a rigid shaft member 112 whose opposite ends are receivable in registered notches 114 in a pair of uprights 116 and 118 secured rigidly at their lowered ends to the cross brace member 18 and at their upper ends to the handle member 24 previously described.

The lower end of the plunger 104 of the jack is provided with a reduced end portion 120 which is received in a bore 122 of the pivoted block member 90. It will therefore be apparent when the operating handle 124 of the jack is manipulated, the plunger 104 will be extended and a reaction force will be transmitted between the uprights and the lever assembly 74 such as to depress the lever and cause elevation of the carriage assembly and consequently the lift arms 44 and 46. The cross brace 18 is provided with a pair of ear members 130 extending rearwardly therefrom and journaling the crosshead portion 132 of a T-bolt member 134 which extends upwardly therefrom through the bore 136 of the pivoted block member 92. A wing nut 138 is engaged on the upper end of the T-bolt in the manner shown most clearly in Figure 4. The purpose of this construction will be presently apparent.

Selectively receivable on the reduced end portion 120 of the jack plunger 104 is the assembly which is illustrated in Figures 11 and 12. This assembly includes a pivoted block member 131 trunnioned as by the pin members 133 to the U-shaped yoke member 135 which has projecting forwardly from its bight portion 140 a shaft member 142 terminating in an enlarged frustoconical head member 144. The block member 131 is provided with a stepped recess 146 for receiving the free end of the jack plunger 104.

In operation, when it is desired to inspect or replace the wheel journaling bearings of the truck or the like, the vehicle is elevated a sufficient amount by any suitable conventional jack mechanism such that its rear wheels are elevated a substantial distance from the ground. The dual wheel assembly on such a truck is indicated generally by the reference character 150. At this time, the bolts which retain and connect the full floating axle flange 152 to the brake drum are removed. There are usually perhaps four, five or six bolts retaining the axle flange 152 to the brake drum assembly and in addition to the bores receiving these bolts, there are tapped openings for the insertion of bolts to be utilized in conjunction with an axle pulling assembly. When the attaching bolts are removed, a strap member 154, see Figures 6 and 7, is attached to the axle flange 152 by means of the bolt member 156 received in a tapped central opening in the axle flange. The strap 154 has rigidly attached thereto hooks 158 to receive the chain elements 160 which extend therefrom to support eye members 162 rigidly secured to the guide posts 20 and 22 previously described. The removing assembly is then positioned in the manner shown in Figure 6 and the chains 160 connected to the hooks 158 in the manner shown. Thereafter, the jack assembly 100 is pivoted within a suitable one of the notches 114 such that it is disposed horizontally with the free end of the plunger 104 thereof against a portion of the outer of the dual vehicle wheels 106. The jack handle 124 is then manipulated such as to extend the plunger 104 which will urge the removing assembly away from the vehicle pulling with it the full floating axle member 170. The force of the jack 100 is of course sufficient to shear off any burrs which might have been formed on the inner splined end of the axle 170 and it will be readily apparent that the removing assembly provides mechanism whereby full floating axles are easily and readily removed from their axle housings.

Figure 2:
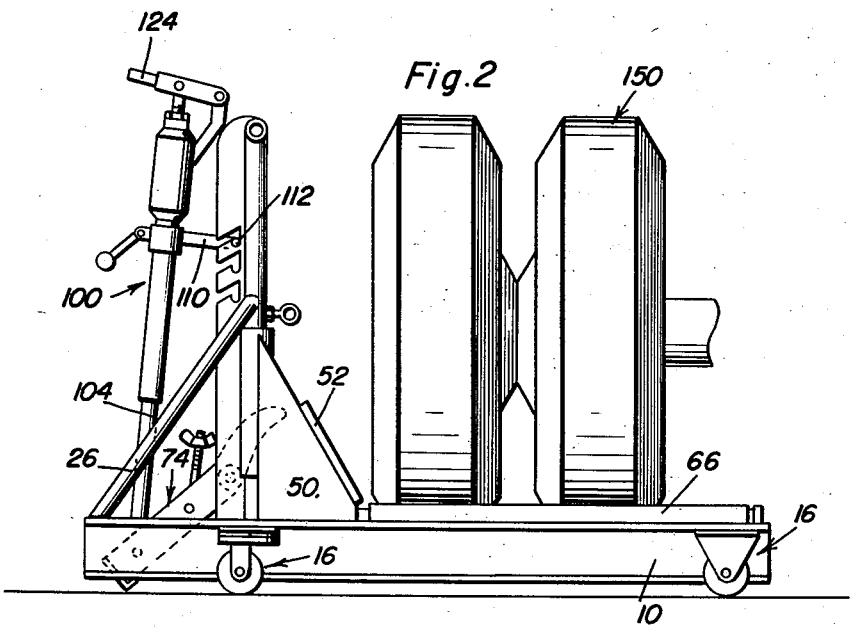
Figure 2 is a side elevational view of the assembly showing the same during the operation of relieving the strain upon the wheel assembly journaling bearings.
Figure 3:
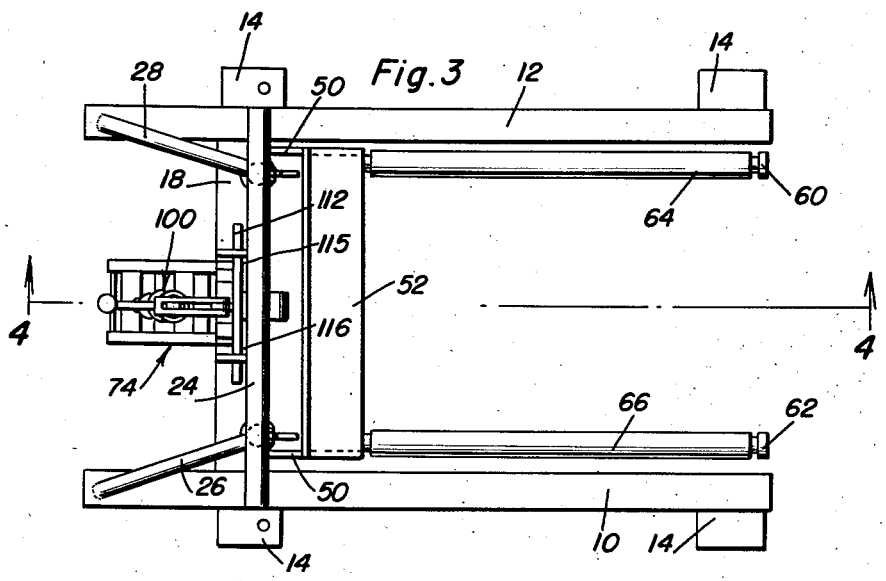
Figure 3 is a top plan view of the assembly shown in Figure 1.

After the axle has been removed, the removing assembly is positioned in the manner shown in Figure 2 with the jack 100 mounted about its trunnion shaft 112 such that it is disposed in a substantially vertical position with the lower end of the plunger 104 engaged in the pivoted block member 90 previously described. The manipulation of the jack handle 124 will then depress the outer end of the lever mechanism 74 and this manipulation is continued until the roller members 64 and 66 engage the dual wheel assemblies 150 sufficiently to relieve the weight of the wheel assemblies from the bearings journaling the wheels upon the extension 170 of the rear axle housing 172 which serves as a support for the inner races of the wheel journaling bearings. When the load has been thus relieved, the wing nut member 138 is threaded down the T-bolt 134 against the pivoted block 92 in such a manner that the elevated position is held in the desired load relieving point. Thereafter, the jack assembly 100 is moved to the horizontal position shown in Figure 8 with the extension or pilot assembly shown in Figures 11 and 12 engaged thereon such that the frustoconical portion 144 is engaged within the free end of the axle housing station 170. At this point, the length of chain 174 is thrown about the wheel assemblies 159 and connected to the eye members 162. The assembly is then ready for manipulation of the jack 100 which will cause the dual wheel assembly and its associated brake drum 176 to be removed from the axle housing in a manner indicated progressively by Figures 8 and 9.

By the provision of the mechanism above described, it will be readily apparent that the removal of a truck axle and its associated wheel assembly may be easily effected at the time the vehicle is normally greased such that the wheel mounting bearings will always be in properly lubricated condition and such that the early stages of progressive fracture of any portion of the bearings or associated mechanism may be readily detected and repaired before a major breakdown occurs.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A tire and wheel removing and applying device comprising a wheeled frame, a pair of vertical guide posts secured to said frame, a carriage slidably received on said posts and including spaced horizontal arms adapted to be disposed beneath and provide a lifting platform for wheel assemblies of an automotive vehicle, means for elevating said carriage, said means including a jack assembly having a main body portion and a plunger extensible therefrom, a pair of uprights secured to said frame intermediate said guide posts and including horizontally aligned notches, said main body portion of the jack having lateral trunnions thereon received in said notches, lever means intermediately pivoted on said frame and including one end portion engageable with said plunger, the other end of which being engageable with said carriage for raising said horizontal arms, and means for locking said carriage in selective elevated positions.

2. A tire and wheel removing and applying device comprising a wheeled frame, vertical guide means secured to said frame, a carriage slidably mounted on said guide means, said carriage including a pair of horizontal arms adapted to be positioned beneath and form an elevating platform for wheel assemblies of an automotive vehicle, means for elevating said carriage, said means including a jack, said jack having a main body portion and an extensible plunger, said main body portion being pivotally mounted on said frame about a horizontal axis portion transverse to and above said horizontal arms of the carriage, lever means intermediately pivoted on said frame and including one end portion engageable with said plunger, the other end of which being engageable with said carriage for raising said horizontal arms, and means for locking said carriage in selective elevated positions.

3. An assembly for removing automotive axles and wheel assemblies comprising a wheeled frame having a pair of spaced horizontal legs interconnected at one end by a cross brace member, a pair of vertical guide posts secured to said cross brace, a carriage slidably received on said guide posts and including a pair of horizontal arms extending in parallelism with and between the legs of said frame and adapted to be positioned beneath and provide an elevating platform for wheel assemblies of an automotive vehicle, means for elevating said carriage, said means including a jack assembly having a main body portion and a plunger extensible therefrom, a pair of uprights secured to said frame provided with notches, said main body portion of the jack having trunnions thereon received in said notches, and lever means intermediately pivoted on said frame and including one end portion engageable with said carriage, the other end of which being engageable with said plunger for raising said horizontal arms.

4. An assembly for removing automotive axles and wheel assemblies comprising a wheeled frame having a pair of spaced horizontal legs interconnected at one end by a cross brace member, a pair of vertical guide posts secured to said cross brace, a carriage slidably received on said guide posts and including a pair of horizontal arms extending in parallelism with and between the legs of said frame and adapted to be positioned beneath and provide an elevating platform for wheel assemblies of an automotive vehicle, means for elevating said carriage, said means including a jack assembly having a main body portion and a plunger extensible therefrom, a pair of uprights secured to said frame provided with notches, said main body portion of the jack having trunnions thereon received in said notches, lever means intermediately pivoted on said frame and including one end portion engageable with said plunger, the other end being engageable with said carriage for adjusting said horizontal arms and means for locking said carriage in selected elevated positions.

5. A tire and wheel removing and applying device comprising a wheeled frame, a vertical guide means secured to said frame, a carriage slidably mounted on said guide means, said carriage including a pair of horizontal arms adapted to be positioned beneath and form an elevating platform for wheel assemblies of an automotive vehicle, means for elevating said carriage, said means including a jack, said jack having a main body portion and an extensible plunger, said main body portion being pivotally mounted on said frame about an axis transverse to and above said horizontal arms of the carriage, lever means pivoted on said frame and including opposite end portions engageable between said carriage and said extensible plunger for adjusting said arms and means for locking said carriage in selected elevated positions.

6. An assembly for removing automotive axles and wheel assemblies comprising a wheeled frame, a pair of vertical guide posts secured to said frame, a carriage slidably received on said guide posts, said carriage including a pair of sleeves embracing said guide posts and interconnected by a horizontal bar, a pair of horizontal arms secured to said sleeves and projecting therefrom to be positioned beneath and provide an elevating platform for wheel assemblies of an automotive vehicle, a lever mechanism pivotally secured intermediate its ends to said frame and engaging at one end beneath said horizontal bar of the carriage for elevating the same, a pair of uprights on said frame, a jack including a main body portion trunnioned between said uprights and an extensible plunger abutting the other end of said lever mechanism, said means for locking said carriage in selected elevated positions.

References Cited in the file of this patent

UNITED STATES PATENTS

| | | |
|---|---|---|
| 1,523,486 | Manley | Jan. 20, 1925 |
| 2,374,045 | Soucia | Apr. 17, 1945 |
| 2,467,500 | Salter | Apr. 19, 1949 |
| 2,490,233 | Schildmeier | Dec. 6, 1949 |
| 2,514,781 | Miller | July 11, 1950 |
| 2,516,260 | Schildmeier | July 25, 1950 |
| 2,583,216 | Hoffman | Jan. 22, 1952 |